United States Patent [19]

Röhringer et al.

[11] Patent Number: 4,722,414
[45] Date of Patent: Feb. 2, 1988

[54] SHIFTING ARRANGEMENT FOR TWO CLUTCHES FOR THE SHIFTING BETWEEN A SINGLE-AXLE STANDARD DRIVE AND A TWO-AXLE ALL-WHEEL DRIVE FOR A MOTOR VEHICLE HAVING TWO DRIVABLE VEHICLE AXLES

[75] Inventors: Arno Röhringer, Ditzingen; Manfred Link, Waiblingen; Jürgen Frank, Reichenbach, all of Fed. Rep. of Germany

[73] Assignee: Daimler-Benz Aktiengesellschaft, Stuttgart, Fed. Rep. of Germany

[21] Appl. No.: 2,951

[22] Filed: Jan. 13, 1987

[30] Foreign Application Priority Data

Jan. 15, 1986 [DE] Fed. Rep. of Germany ....... 3600873

[51] Int. Cl.$^4$ ...................... B60K 17/34; B60K 23/08
[52] U.S. Cl. .................................................. 180/250
[58] Field of Search ............... 180/247, 250, 249, 248, 180/233

[56] References Cited

U.S. PATENT DOCUMENTS 3,963,035 6/1976 Vinton ............................ 180/247

FOREIGN PATENT DOCUMENTS 2066182 7/1981 United Kingdom ................ 180/250

Primary Examiner—John A. Pekar
Attorney, Agent, or Firm—Barnes & Thornburg

[57] ABSTRACT

A shifting arrangement for the shifting between a single-axle standard drive and an all-wheel drive having a first clutch for the locking of a central differential gear and a second clutch for the connecting and disconnecting of one vehicle axle actuated by first and second pressure medium control element respectively against the force of a spring having first and second shift valve respectively controlled by an electronic control unit, to either supply working pressure or relieve from pressure respective control elements. The improvement including a hydraulic identifying valve for bringing the control elements into a mutual interaction. The identifying valve operates, as a function of the working pressure of at least one of the control elements and exclusively during the simultaneous controlling of both shift valves, in such a way that the clutch torque at both clutches increases and decreases approximately to the same extent. As a result, when shifting into a shift step with a balanced all-wheel drive from standard drive, a shifting can first take place for a short time into an intermediate step with a longitudinally locked all-wheel drive for securing the driving stability.

20 Claims, 1 Drawing Figure

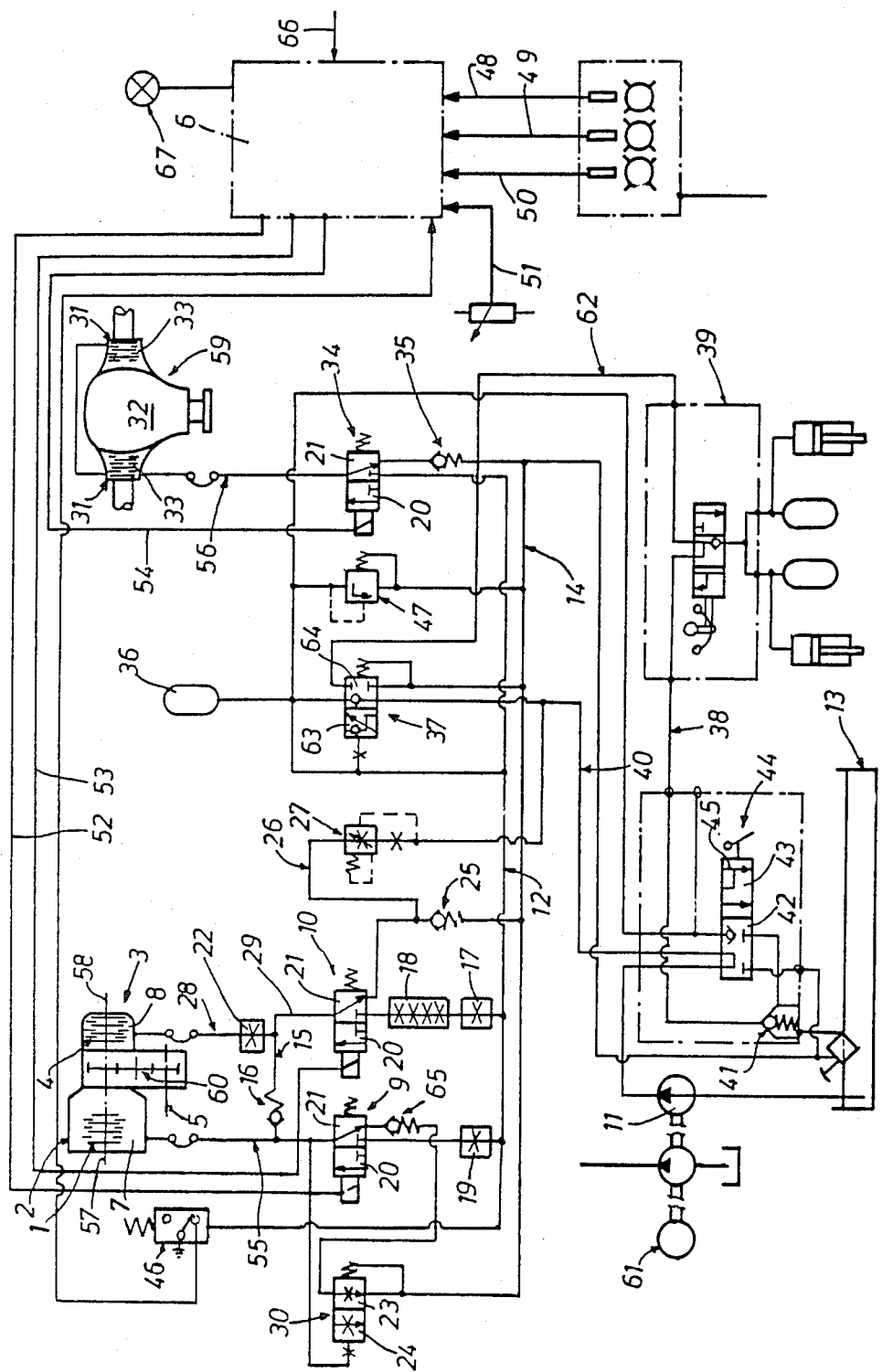

SHIFTING ARRANGEMENT FOR TWO CLUTCHES FOR THE SHIFTING BETWEEN A SINGLE-AXLE STANDARD DRIVE AND A TWO-AXLE ALL-WHEEL DRIVE FOR A MOTOR VEHICLE HAVING TWO DRIVABLE VEHICLE AXLES

BACKGROUND AND SUMMARY OF THE INVENTION

The invention relates to a shifting arrangement for two clutches for the shifting between a single-axle standard drive and a two-axle all-wheel drive for a motor vehicle having two drivable vehicle axles.

A known shifting arrangement of this type (U.S. Pat. No. 3,963,085), by using an additional brake for the braking of a central wheel and driving the planetary carrier by the engine in the case of a central differential gear, aims at an additional all-wheel operation with an unequal distribution of torques on the two driven vehicle axles as well as at an additional single-axle (rear-axle) drive with an overdrive effect. The control unit provides essentially a manual control by means of a manual shifting lever per se affecting the gear change box.

The objective on which the invention is based consists essentially of carrying out, in the case of a shifting arrangement of the initially mentioned type, the shifts as fast and smoothly as possible. But for driving stability, the shifting arrangement is able to provide, for the shifting from standard drive into the shifting step for a balanced all-wheel drive while driving, particularly while driving turns, an intermediate step during which a quasi balanced all-wheel drive is shifted. Namely, during the engaging of the clutch for the driving connection of one vehicle axle, the clutch, for the locking of the differential gear, must first remain engaged at the start of the shifting for a predetermined time period, during which the torque transmission of the other clutch is increased. However, under these circumstances, it must be ensured that the vehicle engine, after the expiration of the mentioned intermediate step, i.e., with the start of the disengaging of the clutch for the locking of the differential gear, cannot rev up to a high speed because of a lacking load.

The explained objective is advantageously achieved by providing hydraulic identifying valve that responds when both shift valves of the clutches are controlled by the control unit and as a function of the working pressure at least one of the control elements. The hydraulic valve interconnects the control elements such that the clutch torque of the clutch to be disengaged decreases only to the extent in which the clutch torque of the clutch to be engaged increases.

In the case of the shifting arrangement according to the invention, smooth and fast shifts are made possible because of the use of frictionally engaged clutches and pressure-medium-operated control elements. In the case of the shifting arrangement according to the invention, the shifting of the endeavored intermediate step can take place in such a way that with the use of two separate shift valves, the first shift valve for the first clutch for the locking of the central differential gear by means of the control unit is controlled in a delayed way with respect to the second shift valve assigned to one vehicle axle. Thus, initially the second vehicle axle absorbs some driving torque, and subsequently the torque decrease at the first clutch of the central differential gear, by means of the pressure-dependently controlled identifying valve, is rendered dependent on the torque increase of the second clutch of the connected vehicle axle.

The shifting arrangement according to the invention can operate irrespectively of whether the respective clutch is engaged by power assistance and disengaged by spring force, or is engaged by spring force and disengaged by power assistance.

For the hydraulic identifying valve that are used for providing a coupling (i.e. a mutual dependence) of the identifying torque of both clutches for permitting load shifts the arrangement, particularly in the case where both clutches are engaged by pressure-medium power assistance, can, for example, also be made in such a way that without the use of a hydraulic connection between the control elements in the working pressure line of at least one of the two control elements, a throttle valve with a variable throttle resistance is connected that is dependent on the working pressure of the other control element and responds to the joint control of both shift valves.

A large throttling restriction is connected between the second shift valve and the feed line and a smaller throttling restriction is connected between the first shift valve and the feed line. The smaller throttling restriction is connected with the second control element only when the first shift valve causes the disengagement of the first clutch. Because of this arrangement, the rise of the clutch moment of the second clutch for the driving connection of one vehicle axle in the intermediate step is relatively flat, but is steep during the transition into the connecting shifting step for the balanced all-wheel drive.

At least one throttling resistance is connected in series with the return line and the second control element when the second shift valve is switch into the switching step for standard drive. Thus, a sudden rise of the clutch moment of the first clutch of the central differential gear at the time of the shifting into standard operation, is reliably avoided.

At least one throttling resistance is provided in series with the first shift valve and the feed line and the return line for the operation of the shifting arrangement according to the invention for the shifts between the shifting step for a balanced all-wheel drive and an additional shifting step for a longitudinally locked all-wheel drive.

A pressure maintaining valve and flow limiting valve are connected in a compensating line with the pressure source or pumped and one of the two control elements to produce a permanent contact of the clutch disks also in the disengaged condition for fast shifts of the clutch for the connecting and disconnecting of one vehicle axle.

By making the first clutch engageable by spring force and the second clutch engageable by working pressure, it is ensured that, in the case of a breakdown of the pressure supply, a forced shifting into the standard drive takes place.

The identifying valve is preferably a check valve being controlled by the working pressure of the first control element to open against a prestressing force in the direction of second control element.

By providing the throttling resistance connected between the feed line and the first shift valve having a smaller cross sectional area than the throttling resistance connected between the feed line and the second shift valve, a simplification of the multiple function of a certain hydraulic resistor results.

By providing the check valve of the identifying valve connecting the first clutch with the second shift valve for the second clutch at a juncture of a throttling resistance connected to the second control element and the second shift valve, a safety circuit is formed. Thus, in the case of a breakdown of the first shift valve, a shifting into the standard drive results whenever the clutch of the central differential gear is disengaged.

A shiftable throttle resistance is connected between the first shift valve and the return line and switches, as a function of the working pressure of the first control element, between a small resistance value in case of a higher pressure and a larger resistance value in case of a lower pressure. Thus, shifting delays are avoided that are caused by an occurring clutch play in the clutch for the central differential gear.

A third clutch with a third pressure controlled control element and shifting valves allows for the shifting into a shifting step for all-wheel drive with a transversely locked driving axle.

Other objects, advantages and novel features of the present invention will become apparent from the following detailed description of the invention when considered in conjunction with the accompanying drawings.

BRIEF DESCRIPTION OF THE DRAWINGS

The figure is a fluid schematic of a shifting arrangement according to the principles of the present invention.

DETAILED DESCRIPTION OF THE DRAWINGS

An electronic control unit 6 processes a braking signal 66 when the vehicle brakes of a motor vehicle are operated, two rotational speed signals 48 and 49 from speed sensors at both wheels of the front axle, a rotational speed signal 50 from a speed sensor at the axle differential gear 32 of the rear axle of which is the arithmetical mean of the rotating speeds of both wheels of the rear axle, and an angle signal 51 proportional to the steering angle of the steering wheel, as described in the German Patent Application No. P 35 05 455.

The control unit 6, on the output side is connected via control lines 52 to 54, with electromagnetic shift valves 9, 10 and 34. The shift valves 7, 10, 34, in a position 20 triggered by the control unit 6, connect a working pressure line 55, 28/29, 56 respectively with a feeding pressure line 12 and block a return line 14 with respect to the working pressure line. In a second position 21 shifted by means of spring force, the shift valves 9, 10 and 34 connect their respective working pressure line 55, 28/29, 56 with the return line 14 and block the feeding pressure line 12 with respect to the working pressure line.

The motor vehicle has a transfer transmission 3 with an input shaft 57 that can be driven by its driving engine 61 (low left in the Figure) via a gear change box, an output shaft 58 used for driving the rear axle 59 and a power takeoff shaft 5 used for driving the front axle. The transfer transmission 3 also has a central planet wheel differential gear 2 with a multi-disk clutch 1, a spur gear system 60 as well as another multi-disk clutch 4. The central differential gear 2, is connected with the input shaft 57 by an outer central wheel, is connected with the output shaft 58 by two mated double planets on the planet carrier, and is connected with the power takeoff shaft 5 via its clutch 4, and the spur gear system 60. The clutch 1, is used for the locking of the central differential gear 2, is engaged by means of spring force and is disengaged by means of a pressure-medium control element 7 of the axial-piston design that is connected to the working pressure line 55. The clutch 4, used for connecting and disconnecting the front axle to the transfer transmission 3, is disengaged by spring force and is engaged by a pressure-medium control element 8 of axial-piston design, that is connected to the working pressure line 28.

The rear axle 59 can be driven in the conventional way via an axle differential gear 32 that can be locked by two parallel-shifted multi-disk clutches 31. The clutch 31 are disengaged by spring force and are engaged by a pressure-medium control element 33 of axial-piston design that are connected to the working pressure line 56.

A pressure-medium pump 11 driven by the driving engine 61 takes in from a pressure-medium storage tank 13 and, is connected to a storage means charge valve 37 via service valve 44 and a pump pressure line 40. Connected to the charge valve 37 are also the feeding pressure line 12, the return line 14 and an auxiliary feeding pressure line 62. Pressure line 62 is the pressure supply of a level control means 39, which is connected to the storage tank 13 by an auxiliary return line 38.

The charge valve 37 can be switched between rest position 63 and a charging position 64 as a function of the pressure of feeding pressure line 12. In the rest position 63, the pump pressure line 40 is connected with the auxiliary feeding pressure line 62. In the charging position 64, the pump pressure line 40, via a check valve opening in the direction of the feeding pressure line 12, is connected with the feeding pressure line 12 and as a result, also with the pressure reservoir 36.

The shift valve 9 is connected with the feeding pressure line 12 via a relatively wide restriction 19, and, is connected with the return line 14, via a check valve 65 opening in the direction of a throttle valve 30 and the throttle valve 30.

The throttle valve 30, as a function of the working pressure of the control element 7 of the clutch 1 on line 55, can be shifted between two positions 23 and 24. For pressures lower than 25 bar, the throttle valve 30 takes up position 23 and a narrow restriction is in effect. For pressures higher than 25 bar, throttle valve 30 takes up position 24 and a wide restriction is in effect.

A relatively wide restriction 22 is connected into the working pressure line 28 of the control element 8. A section 29 of the working pressure line 28 leading to the shift valve 10, is connected with the working pressure line 55, via short-circuiting line 15, and a check valve 16. The check valve 16 blocks in the direction of the working pressure line 55, and is controlled to open against a spring prestressing force of 4 bar. The check valve 16 is an identifying valve identifying the relative torques in the clutches.

The shift valve 10, is connected with the feeding pressure line 12 by a plurality of cascade-connected restrictions 17 and 18 and is connected with the return line 14 by a pressure-keeping valve 25. In order to be able to maintain a contact pressure for the disks in control element 8, of about 1.8 bar, the pressure keeping valve 25 is connected to the pump pressure line 40, via a compensating line 26, and a current-limiting valve 27, is connected into the auxiliary return line 38 in pressure-keeping valve 41.

For reasons of safety, the feeding pressure line 12, is connected with the return line 14 by a pressure-limiting valve 47 that opens in the case of pressure higher than about 38 bar.

The shift valve 34 is connected directly with the feeding pressure line 12, but is connected with the return line 14 via a spring-loaded check valve 35.

A service valve 44, that can be shifted manually between an operating position 42 and a testing position 43, is connected into the pump pressure line 40. In the operating position 42, the pump 11 is connected with the charge valve 37. In the testing position 43, the pump 11 and the charge valve 37 are connected with the storage tank 13. For connecting the feeding pressure line 12 with the storage tank 13, the service valve 44 also has a valve passage 45 that is blocked in the operating position 42 and is open in the testing position 43.

The pressure reservoir 36, is connected to a pressure switch 46 via the feeding pressure line 12. The pressure switch 46 is connected to control unit 6 and is opened when the pressure in line 12 is lower than about 5 bar. An indicator 67 is connected to control unit 6 and displays the state of the pressure supply and of the control unit 6.

With respect to the aspects of driving dynamics, the control unit 6 controls the shifting arrangement to shift between the following shifting steps:

Shifting step "standard drive": In this driving condition the clutch 1 is engaged, while the clutches 4 and 31 are disengaged.

Shifting step "balanced all-wheel drive": In this driving condition only the clutch 4 is engaged, while the clutches 1 and 31 are disengaged.

Shifting step "longitudinally locked all-wheel drive": In this driving condition the two clutches 1 and 4 are engaged, while the clutch 31 is disengaged.

Shifting step "all-wheel drive with a transversely locked vehicle axle": In this driving condition all clutches 1, 4 and 31 are engaged.

The supply pressure is primarily made available to the shift valves 9, 10 and 37 by the storage means charge valve 37. The pressure level is maintained between 28 bar and 33 bar by the pressure-limiting valve 47.

When a speed difference of the wheels is recognized via the rotational speed sensors, the connecting of the hydraulically actuated clutches takes place and thus also the shifting into the respective shifting steps.

Because of the engine torque to be transmitted, the shifting steps "standard drive" and "longitudinally locked all-wheel drive" are always shifted before the shifting step "balanced all-wheel drive". In this case, the clutch 4 is activated first by activating shift valve 10 and in a delayed way, the clutch 1 is deactivated by activating shift valve 9 so that a revving-up of the engine is prevented. At first, the restrictions 17, 18 and 22 are relevant for the pressure rising time of the clutch 4. When the response pressure of the check valve 16 has been reached, i.e., 4 bar, the restrictions 19 and 22 are responsible for the further pressure rising time. Almost at the same time, the clutch 1 also reaches its maximum pressure Thus, the check valve 16 is important in two respects. First, it can be used for varying the pressure rising and pressure reducing time. In addition, the check valve provides a safety shifting system in case the clutch 4 is engaged and the clutch 1 is disengaged and the shift valve 10 becomes defective. Under these circumstances shift valve 10 is in position 21 and shift valve 9 is in a position 20, a shifting into the "standard drive" takes place automatically because the working pressure line 55 of clutch 1, via the check valve 16, is connected to the return line 14.

The starting point for the shifting into the shifting step "longitudinally locked all-wheel drive" is the shifting step "balanced all-wheel drive,", i.e., both shift valves 9 and 10 are activated so that pressure is admitted to both clutches, in which case the clutch 4 is engaged and the clutch 1 is disengaged.

When now the shift valve 9 is deactivated, the clutch 1 shifts into the pressureless condition. The oil displaced by the clutch 1 that is under tension, via the check valve 65 and the pressure-dependently shifted restriction 24 of throttle valve 30, flows rapidly to the storage reservoir 13. The restriction 24 is designed for a maximum drain time of 20 milliseconds. When the pressure reaches a value of about 25 bar, the throttle valve 30 shifts to the smaller cross section of restriction 23. Thus, the occurring pressure peaks, produced by the check valve 65 have no effect on the clutch 1.

At 23 bar, the clutch 1 starts to transmit torque. The further pressure decrease takes place slowly via the now smaller cross section restriction 23 that is designed for a discharge time of maximally 1,200 milliseconds.

This shifting logic during the control of the clutch 1 is necessary because, when the clutch 1 is disengaged, play is created for tolerance reasons. The throttle valve 30 has the objective to eliminate as fast as possible the play that exists when the clutch 1 engages.

The starting condition for a shifting into the shifting step "all-wheel drive with a transversely locked vehicle axle" is the shifting step "longitudinally locked all-wheel drive,", i.e., the shift valve 10 is activated and the shift valve 9 is deactivated.

When now, because of another slip criterion, the circumstance arises that the rear axle 59 is to be locked, the shift valve 34 is activated. In this case, it is advantageous to provide a restriction in the working pressure line 56 in order to be able to determine the time sequence of the torques.

In the case of a shifting into the shifting step "standard drive" from the shifting step "balanced all-wheel drive", pressure is first admitted to both clutches 1 and 4, i.e., the clutch 4 is engaged and the clutch 1 is disengaged.

For example, by means of actuating the service brake, both shift valves 9 and 10 become deactivated via the control unit 6 which shifts in the "standard drive". The oil volume of the clutch 1 tries to flow off as fast as possible through the pressure dependent throttle valve 30. However, starting at about 25 bar, this throttle switches over to the smaller cross section restriction 23. At the same time, the oil volume of the clutch 4, via the larger cross sectional restriction 22 and the check valve 25, flows off faster into the storage tank 13. However, as a result, the oil return flow from the clutch 1 can also take the faster flow-off route via the check valve 16 and the check valve 25, namely as long as this is permitted by the pressure adjusted at the check valve 16.

Thus, by means of the check valve 16, this arrangement provides an ideal possibility to intervene for an extensive time Period for the purpose of controlling into the shifting step "standard drive" while having smooth torques.

The check valve 16 also has a regulating effect on the pressure buildup during the shifting into the shifting step "balanced all-wheel drive", as described above.

So that, during the shifting into the shifting step "balanced all-wheel drive" the buildup of torque can take place rapidly and smoothly, the disks of the clutch 4 must rest against one another without play. This takes place by means of the check valve 25, that with about 1.8 bar against a spring in the clutch 4, lets the disks continuously rest against one another. So that this pressure is maintained, a flow control valve 27 is installed that branches leakage oil off from the pump flow at the pressure-maintaining valve 25 via valve 37 and by means of the resistance valve 41.

Since a joined clutch 4, for functional reasons is necessary for the driving operation, as described above, the service valve 44 is used from the complete separating of the disks of the clutch. By means of this service valve 44, the control system, when the vehicle is brought to the brake and performance test stand, must be made pressureless. This takes place by shifting a lever at the service valve 44 from the operating position 42 into the test position 43. Thus, the pump flow is again led directly to the storage tank 13. At the same time, a check valve is opened mechanically. The pressure reservoir 36 is emptied via the valve passage 45. In addition, the pressure reduction of the prestressed clutch 4 is supported by a spring installed in the transmission. If the system pressure is reduced, a flow display 67 is made to light up by means of the pressure switch 46. The pressure switch 46 also monitors the availability of the hydraulic system. It switching point is fixed at 5 bar. The passing through the pressure range of 5 bar to 0 bar, for the malfunction indicating, is covered by a time function element. When the malfunction indicator 67 lights up, concurrently with the pressureless hydraulic system, the electronic control system 6 is also inoperative. Hydraulic system toward 0 bar means that the shift step "standard drive" is shifted. In this way, the vehicle can be tested without problems on the brake and performance test stand. After the conclusion of the testing operation, the service valve 44 must be returned into the operating position 42.

The service valve 44 can be housed in the engine compartment so that it is easily accessible. By means of a simple shifting of the lever into the test position 43, the undesirable connecting is avoided during the testing by axle according to Par 29 StVZO (testing of service brake), or the demounting of a drive shaft in the case of vehicles with a permanent all wheel drive.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a shifting arrangement for a system having first clutch with frictional engagement for the locking of a central planetary wheel differential gear of a transfer transmission for the drive of two vehicle axles of a motor vehicle and a second clutch with frictional engagement for the driving connection between the transfer transmission and one vehicle axle, the shifting arrangement including a first and second control element for said first and second clutch respectively driven by a hydraulic pressure-medium auxiliary force and connected, either with a feeding pressure line supplied by a pressure source or with a return line leading to an essentially pressure-relieved storage tank by first and second shift valve respectively controlled by a control unit, for the actuating of the clutches between a shift step for a single-axle standard drive—in which the first clutch gear is engaged and the second clutch is disengaged—and a shift step for a balanced all-wheel drive—in which the first clutch gear is disengaged and the second clutch is engaged, the improvement comprising:

hydraulic identifying valve means that responds when both shift valves are controlled and, as a function of the working pressure of at least one of the control elements for interconnecting said control elements, such that the clutch torque of the clutch to be disengaged decreases only to the extent in which the clutch torque of the clutch to be engaged increases.

2. A shifting arrangement according to claim 1, including a larger throttling resistance means connected between the second shift valve and the feeding pressure line, and a smaller throttling resistance means connected between the first shift valve and the feeding pressure line, said identifying valve means connecting the smaller throttling resistance means to the second control element of the second clutch only in the position of the first shift valve causing the disengaging of the first clutch of the differential gear.

3. A shifting arrangement according to claim 1, including at least one throttling resistance means connected in series with the second control element of the second clutch and the second shift valve.

4. A shifting arrangement according to claim 1, wherein at least one throttling resistance means is connected in series between the first shift valve and each of the feeding pressure line and the return line.

5. A shifting arrangement according to claim 1, wherein at least one of the two control elements affects its clutch in the sense of an engagement by fluid pressure and the pertaining shift valve is connected with the return line via a pressure-maintaining valve means.

6. A shifting arrangement according to claim 5, including a compensating line fed by the pressure source and connected to the pressure-maintaining valve means.

7. A shifting arrangement according to claim 6, including a flow-limiting valve connected in the compensating line.

8. A shifting arrangement according to claim 1, wherein the first clutch of the differential gear is engaged by spring force, and the second clutch for one vehicle axle is engaged by working pressure force of the second control element.

9. A shifting arrangement according to claim 8, wherein the identifying valve means includes a check valve in a short-circuiting line that connects the two control elements with one another, said check valve being controllable by the working pressure of the first control element to open against a prestressing force in the direction of the second control element of the second clutch.

10. A shifting arrangement according to claim 1, including a first throttling resistance means connected between the feeding pressure line and the first shift valve for the first control element of the first clutch for throttling the flow therebetween and having a smaller cross sectional area than a second throttling resistance means connected between the feeding pressure line and the second shift valve for throttling the flow therebetween.

11. A shifting arrangement according to claim 1, including a throttling resistance means connected in series between the second control element of the second clutch and the second shift valve, and wherein the identifying valve means is connected with the second control element via the throttling resistance means, but is connected with the second shift valve directly.

12. A shifting arrangement according to claim 1, including throttling resistance means connected between the first shift valve of the first control element of the first clutch of the differential gear and the return line, and as a function of the working pressure of the control element, changes between a small resistance value in the case of higher pressure values and a larger resistance value in the case of pressure values below a limit value.

13. A shifting arrangement according to claim 12, including a check valve, that locks in the direction of the shift valve, connected between the first shift valve of the first clutch of the central differential gear and the throttling resistance means connected with the return line.

14. A shifting arrangement according to claim 1, including at least a third clutch, for the locking of an axle differential gear of the vehicle axle driven in the standard drive, a third control element of the third clutch is operated by a pressure-medium auxiliary force and is connected with the feeding pressure line or with the return line by a third shift valve controlled by the control unit.

15. A shifting arrangement according to claim 14, including pressure-maintaining valve connected between the third shift valve of the third clutch of the axle differential gear and the return line.

16. A shifting arrangement according to claim 15, including a pressure reservoir connected to the feeding pressure line and to a charge valve operating as a function of the storage pressure, to charge the pressure reservoir by a pump, the charge valve provides the additional pressure supply of a consuming means that is independent of the drive of the vehicle axles and said consuming means is connected with the storage tank via an auxiliary return line, and a compensating line is branched off from a pump pressure line leading from the pump to the charge valve and a pressure-maintaining valve is connected into the auxiliary return line.

17. A shifting arrangement according to claim 16, including a service valve connected in the pump pressure line that can be shifted between an operating position connecting the pump with the charge valve and a testing position connecting the pump as well as the charge valve with the storage tank.

18. A shifting arrangement according to claim 17, wherein the service valve, for the connection of the feeding pressure line with the storage tank has a valve passage that is blocked in the operating position and open in the testing position.

19. A shifting arrangement according to claim 1, including a pressure switch means connected into the feeding pressure line for providing a signal to the control unit.

20. A shifting arrangement according to claim 1, including pressure-limiting valve in series between the feeding pressure line and the return line.

* * * * *